(12) United States Patent
Muramatsu

(10) Patent No.: US 7,729,854 B2
(45) Date of Patent: Jun. 1, 2010

(54) SYSTEM AND METHOD FOR NAVIGATION

(75) Inventor: Toshiro Muramatsu, Zushi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1195 days.

(21) Appl. No.: 11/316,113

(22) Filed: Dec. 22, 2005

(65) Prior Publication Data
US 2006/0142939 A1 Jun. 29, 2006

(30) Foreign Application Priority Data
Dec. 28, 2004 (JP) .............................. 2004-381377

(51) Int. Cl.
G01C 21/34 (2006.01)
(52) U.S. Cl. .................. 701/209; 340/995.19
(58) Field of Classification Search ......... 701/207–213; 340/995.1–995.23
See application file for complete search history.

(56) References Cited

U.S. PATENT DOCUMENTS 6,249,740 B1  6/2001  Ito et al.

2002/0044070 A1  4/2002  Duckeck
2003/0028314 A1  2/2003  Nagamune

FOREIGN PATENT DOCUMENTS

| EP | 1 063 493 A2 | 12/2000 |
| EP | 1 256 785 A2 | 11/2002 |
| EP | 1 288 624 A2 | 3/2003 |
| JP | 2002-318135 | 10/2002 |

Primary Examiner—Richard M. Camby
(74) Attorney, Agent, or Firm—Young Basile

(57) ABSTRACT

A navigation system performs route guidance with map information, which is suited for use in navigating a vehicle or other movable object. The system includes a user interface in which starting point and destination are input to a service provider. A service provider determines the route between the starting point and destination and generates driving directions and map images for one or more turning points along the routes. Map images near the turning points are displayed to the user, along with the driving directions for each turning point. A mark indicating the position of the vehicle itself is superimposed on the map image that is displayed to the driver.

29 Claims, 13 Drawing Sheets

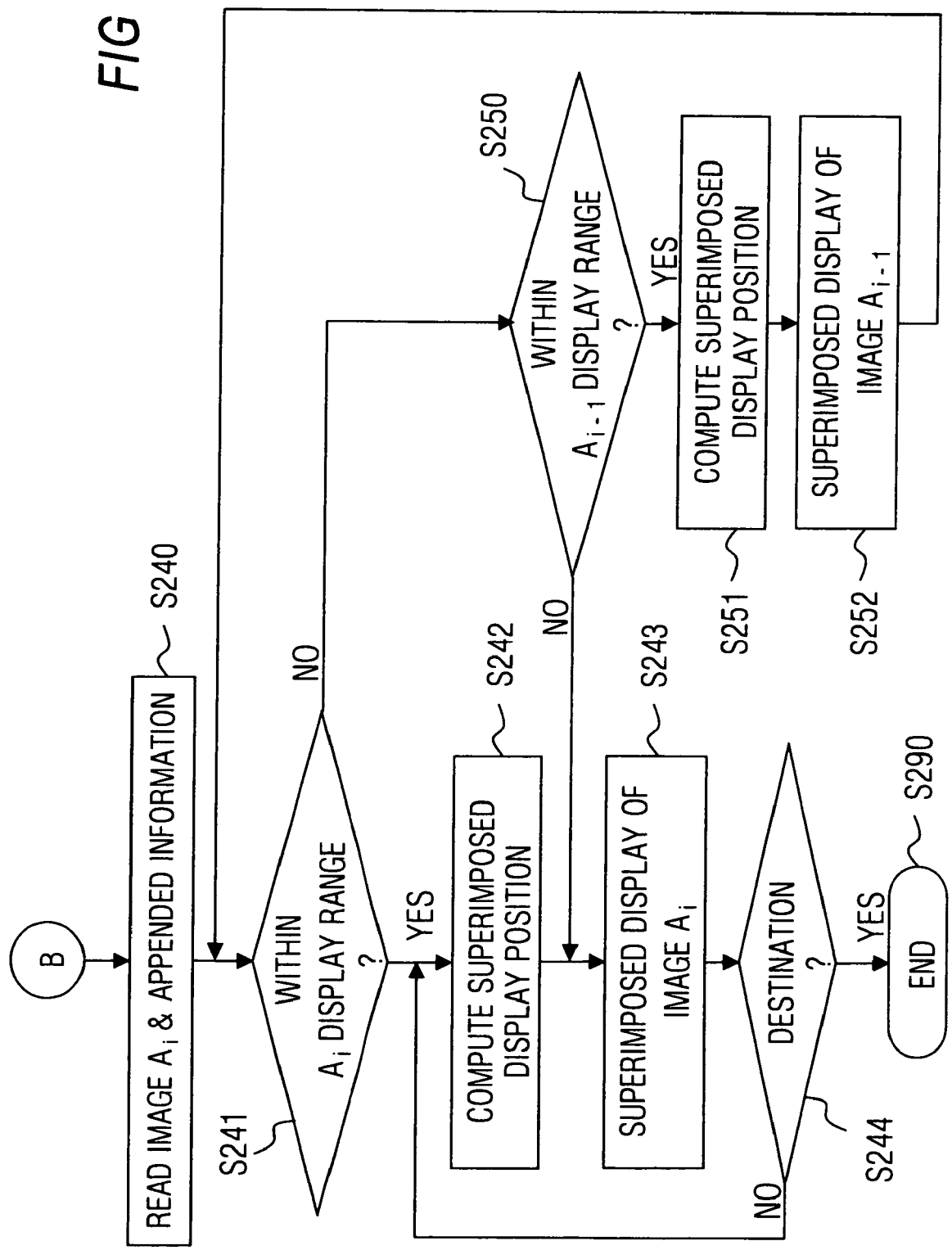

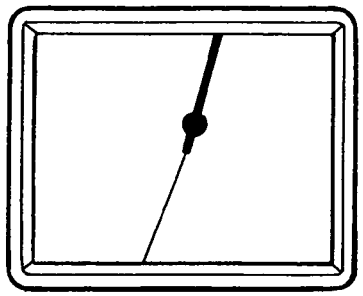
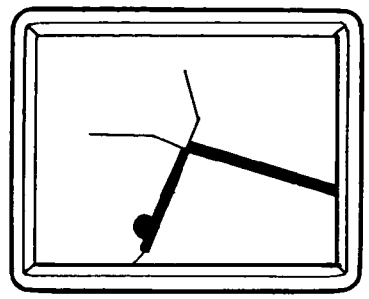
FIG. 12A        FIG. 12B
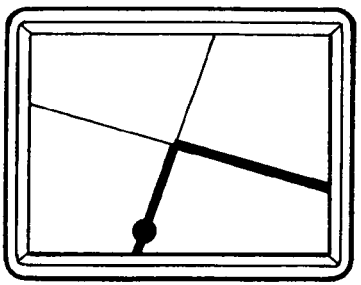
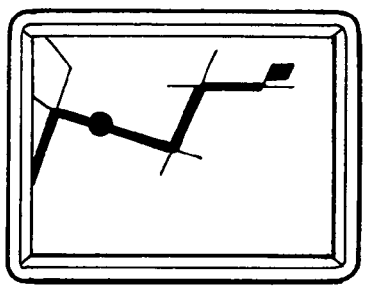
FIG. 12C        FIG. 12D
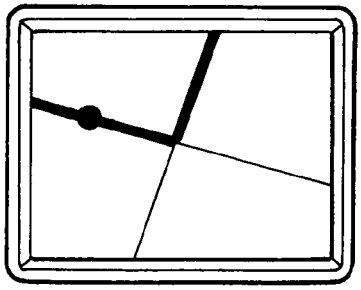
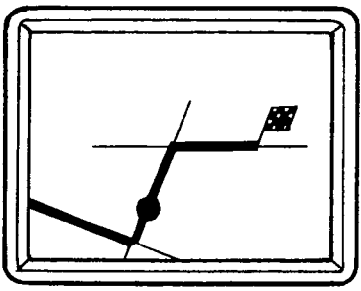
FIG. 13A        FIG. 13B
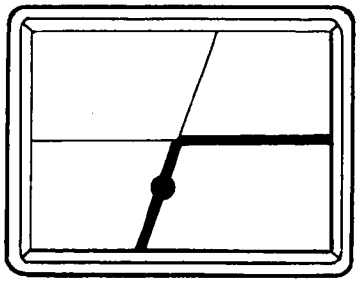
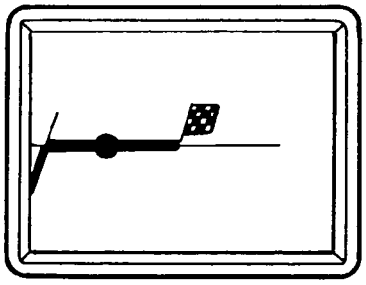
FIG. 13C        FIG. 13D

SYSTEM AND METHOD FOR NAVIGATION

BACKGROUND

The present invention pertains to the technical field navigation systems, and in particular to step-by-step navigation systems in which a vehicle or other movable body is guided from a starting point to a destination.

In recent years, onboard navigation systems for vehicles have become popular in Japan and some other countries. This is a high performance system, with a high definition display unit and a large volume memory device that allows easy display of the guiding route to the destination for the driver or the like with reference to prestored wide ranging map information. More specifically, for example, it has the following functions: the position of the vehicle itself is superimposed and displayed on the map shown on the display unit; the guiding route is displayed in a different color; and intersections or the like are expanded and displayed on the map. Consequently, the driver can easily check the position of the vehicle itself and the guiding route.

On the other hand, there is a type of navigation system that is equipped with a display unit that can only display simple characters or symbols or the like that displays the distance to the destination, the travel direction at an intersection, etc. with simple numeric data or arrows or the like instead of displaying a map. This simple navigation system is known as a step-by-step system or turn-by-turn system, and has been adopted in Europe, the U.S.A. and other locales.

The step-by-step navigation systems require only minimal functionality, and the device is inexpensive. This is an advantage. More specifically, the display unit does not require high performance, and there is also no need to have a large-capacity storage device that can store large amounts of map imagery.

Also, since the quantity of visual information displayed on the display unit is small, the driver watches and checks the display unit with less frequency. As a result, driving the vehicle becomes safer. This is also an advantage.

In recent years, a step-by-step navigation system has been developed that notifies the driver of the appropriate route as the driver is guided, the uneasiness of the driver due to the small quantity of information can be eliminated, and the system is highly convenient, as shown for example in Japanese Kokai Patent Application No. 2002-318135.

Even with such measures, however, the lack of guidance information in the step-by-step navigation system, due to its basic characteristic of displaying minimal information such as characters and symbols, etc., instead of displaying a map remains a factor. In many cases, drivers may be dissatisfied due to insufficient information and difficulty in understanding the guidance is unavoidable. For example, when guidance is performed at an intersection where the course should be changed by turning left/right, etc., it may be difficult to completely guide the driver using characters and symbols without displaying a map.

SUMMARY

In the embodiments described below, a system, method and computer program are provided for navigation which maintains benefits of step-by-step navigation systems while providing map information.

In accordance with one aspect of the invention, a navigation system is provided for guiding a movable object from a starting point to a destination. The system includes a user interface adapted to accept information pertaining to the destination and the starting point; a route computing module in communication with the user interface and adapted to generate a route from the starting point to the destination and to generate driving directions or other guidance information for guidance along the route, the guidance information including at least one turning point on the route; an image data generation module adapted to generate at least one map image for a prescribed range around the turning point; a position information acquisition module that outputs the position of the movable body; a display image generation module responsive to the moveable body position detector to superimpose on the map image an indicia indicating the position of the movable body when the movable body is within the prescribed range of the prescribed site; and a display adapted to display the guidance information, the map image, and the indicia superimposed on the map image to indicate the position of the movable body.

In accordance with another aspect of the invention, a method is provided for navigating a movable object from a starting point to a destination. The method includes: inputting the information pertaining to the destination and starting point;

using a database of map information, computing a route for the moving body from the starting point to the destination point; determining at least one prescribed site along the route where the course of the moving body will change; generating a map image for an area within a prescribed range of the prescribed site; determining the location of the movable body; and if the movable body is within the prescribed range of the prescribed site, displaying the map image with the indicia superimposed on the map image to indicate the location of the movable body.

In accordance with another aspect of the invention, a server is provided for generating information for navigating a movable body from a starting point to a destination. The server includes an input to receive the starting point and destination; memory on which is stored map image information and route information; a route computing module in communication with the user interface and adapted to generate a route from the starting point to the destination and to generate driving directions or other guidance information for guidance along the route, the guidance information including at least one turning point on the route; and an image data generation module responsive to the route computing module and adapted to generate at least one map image for a prescribed range around the turning point.

In accordance with another aspect of the invention, a movable body terminal device is provided for use in a navigation system. The terminal device includes: a receiver adapted to receive guidance information for the route, including at least one prescribed site, and map image information for an area within a prescribed range around the prescribed site; a position information acquisition module that outputs the position of the movable body; a display image generation module responsive to the position information acquisition module to superimpose on the map image information an indicia indicating the position of the movable body when the movable body is within the prescribed range of the prescribed site; and a display adapted to display the guidance information, the map image information and the indicia superimposed on the map image information to indicate the position of the movable body.

In accordance with another aspect of the invention, a computer program product is provided for a server used in a navigation system. The computer program product includes computer-readable medium having a control logic stored therein for causing a computer to accept as input a starting point and a destination; determine a route from the starting point to the destination using map data, which route includes at least one prescribed site where guidance information will be provided to a user; generate guidance information including map image information for an area within a prescribed range of the prescribed site.

In accordance with another aspect of the invention, a computer program product is provided for in a movable body terminal device used in a navigation system. The computer program product includes a computer-readable medium having a control logic stored therein for causing a computer to: accept as input guidance information for the route from the destination to the starting point and map image information for at least one area within a prescribed range around at least one prescribed site on the route; accept as input the position of the movable body; superimpose on the map image information an indicia indicating the position of the movable body when the movable body is within the prescribed range of the prescribed site; and display the guidance information, the map image information and indicia imposed on the map image information to indicate the position of the movable body.

BRIEF DESCRIPTION OF THE DRAWINGS

The description herein makes reference to the accompanying drawings wherein like reference numerals refer to like parts throughout the several views, and wherein:

FIG. 5 is a continuation of the flow chart of FIGS. 4A and 4B.

FIGS. 12A through 12D are a first set of diagrams of an image displayed on the display module of the information terminal of the vehicle according to the processing shown in FIGS. 10A, 10B and 11.

FIGS. 13A through 13D are a second set of diagram of an image displayed on the display module of the information terminal of the vehicle according to the processing shown in FIGS. 10A, 10B and 11.

DETAILED DESCRIPTION

In the embodiments disclosed below a navigation system and method is provided that maintains advantages of the step by step navigation system, while providing map information to facilitate navigation when route guidance is provided.

Also, the present invention provides a type of server for a guide system and guide method, its movable body terminal device, a guidance information provision processing program, and a program for the guide system terminal device.

First Embodiment

In the following, an explanation will be given regarding the first embodiment with reference to FIGS. 1-8.

This embodiment of the present invention will be explained with reference to a step-by-step navigation system that is carried aboard the vehicle and guides the driver of the vehicle (also called the user) along the route to the destination (hereinafter to be referred to as a navigation system) as an example.

Figure 1:
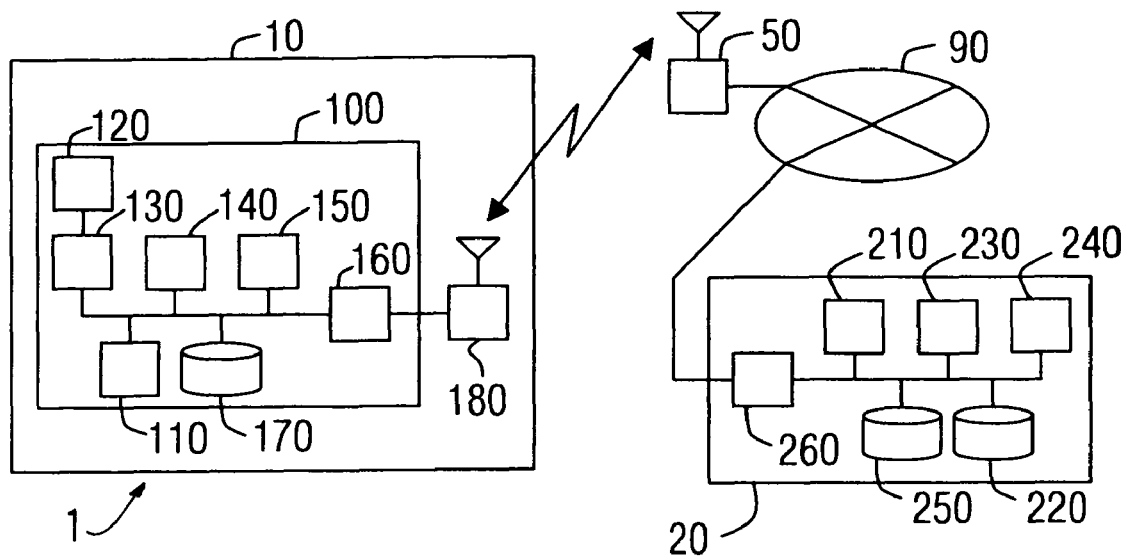
FIG. 1 is a block diagram a navigation system in accordance with a first embodiment of the invention.

FIG. 1 is a block diagram illustrating the overall constitution of a navigation system 1. The navigation system 1 comprises a service provider 20, an information terminal 100 and a communication module 180 carried aboard a vehicle 10, a communications provider 50, and a communications network 90, which in this case is the Internet.

The service provider 20 determines the route for guiding vehicle 10 from the starting point to the destination based on the starting point and destination information for vehicle 10 input through information terminal 100 of vehicle 10 via network 90, generates the information for guiding vehicle 10 on the route, and provides this to information terminal 100.

The service provider 20 has the following modules: an input/output control module 210, a map database 220, a route computing module 230, an image data generation module 240, a temporary storage module 250, and a communication module 260.

The input/output control module 210 performs communication with information terminal 100 via communication module 260 and network 90, and it receives the user's request for route guidance. After receipt of the request, it transmits the information generated by service provider 20 via communication module 260 and network 90 to information terminal 100.

The map database 220 is a database for storing various information for determining the route from the starting point to the destination after a request from information terminal 100, and for guiding the driver on the route. For example, map database 220 can store the road information, map information, etc., for all of Japan.

Based on the user's request for route guidance received via input/output control module 210, route computing module 230 determines or computes the actual route with reference to map database 220. For example, the route is determined taking into consideration the total length of the route, the time demanded, road conditions, condition of vehicle 10, etc. The map information and road information recorded in map database 220 and the information on conditions input together with the user's request for route guidance from information terminal 100 (vehicle 10) are used as the evaluation information that takes into consideration the conditions.

When the route appropriate to the requested conditions is determined, route computing module 230 generates the guide information for guiding vehicle 10 along the route, that is, the names of the road on the route, the travel distance to landmarks or the destination, the names of intersections where left/right turns are made, etc. In principle, the guidance information is generated as text information. The generated guidance information is stored in temporary storage module 250.

Also, route computing module 230 outputs the information pertaining to the determined route to image data generation module 240 for generating the image data for route guidance.

Also, route computing module 230 may determine a unique route or plural routes according to the route determination conditions from information terminal 100.

The image data generation module 240 generates the image data by which information terminal 100 guides the driver of vehicle 10 on the route determined by route computing module 230.

In this embodiment, image data generation module 240 generates the image data for guidance by means of the following processing.

Image data generation module 240 determines the sites on the determined route where the course (movement direction) should be changed, such as turning right/left at an intersection, etc. (hereinafter "turning points"), as sites on the route where the course of the movable body should be guided or as sites where the map image is formed.

Then, image data generation module 240 extracts from map database 220 the map image information in the prescribed ranges that have the sites at the center.

Then, image data generation module 240 superimposes prescribed characteristic lines (such as wide lines, lines in prescribed colors, etc.) on the road and course constituting the guidance route to facilitate visual recognition.

In this case, arrows, etc., can be added along the course as needed.

For image data formed in this way, the central position information (that is, the position of the site on the route where the course of the movable body should be guided), the information indicating the range of the map image, the information indicating the scale of the map image, etc., are attached as appended information to form the image data provided to the user. In this embodiment, the latitude and longitude information for the site are used as the information indicating the central position of the map image.

The generated image data (including the appended information) is temporarily stored in temporary storage module 250.

The temporary storage module 250 stores the guidance information generated in route computing module 230 corresponding to the user's request for route guidance and the image data generated in image data generation module 240. The information stored in temporary storage module 250 is sent under the control of input/output control module 210 from communication module 260 to information terminal 100 via network 90.

Communication module 260 is a communication control means allowing service provider 20 to communicate with information terminal 100 of vehicle 10 via network 90.

The information terminal 100 carried on vehicle 10 is a terminal device that displays the information provided by service provider 20 to the driver of vehicle 10, and that guides the driver of vehicle 10 with the route to the destination.

The information terminal 100 has the following modules: arithmetic operation module 110, display module 120, display image generation module 130, operation input module 140, position information acquisition module 150, interface 160, and storage module 170.

The arithmetic operation module 110 performs overall control of information terminal 100, and performs processing of the route that guides the driver of vehicle 10.

The display module 120 is a display unit for displaying the route information that guides the driver of vehicle 10.

Based on the guidance information and image data provided by service provider 20, display image generation module 130 generates the image to be displayed on display module 120 for the driver.

The processing in arithmetic operation module 110 and display image generation module 130 and the display and image content on display module 120 will be explained in more detail later with reference to specific examples when the operation of information terminal 100 is explained.

The operation input module 140 is a means for the driver of vehicle 10 to operate information terminal 100. The driver of vehicle 10 performs operations via operation input module 140 such as inputting the starting point or destination of vehicle 10, transmission of the input information to service provider 20, reception of the guidance information and image data from service provider 20, instructions for starting the route guidance operation, etc.

The position information acquisition module 150 is a means for determining the position of vehicle 10, and in this embodiment, it is a GPS device.

The interface 160 is an interface between information terminal 100 and communication module 180.

Also, storage module 170 is a storage means that stores the route guidance information and image data downloaded from service provider 20.

The communication module 180 carried on vehicle 10 is a communication means that is connected via communications provider 50 to network 90. As a result, information terminal 100 can communicate with service provider 20 via network 90, and it can access services from service provider 20.

In the following, the operation of navigation system 1 with the constitution above will be explained with reference to FIGS. 2-7.

The operation of acquiring the guidance information by information terminal 100 from service provider 20, that is, the operation of providing guidance information from service provider 20 to information terminal 100, will be explained based on FIGS. 2 and 3.

Figure 2:
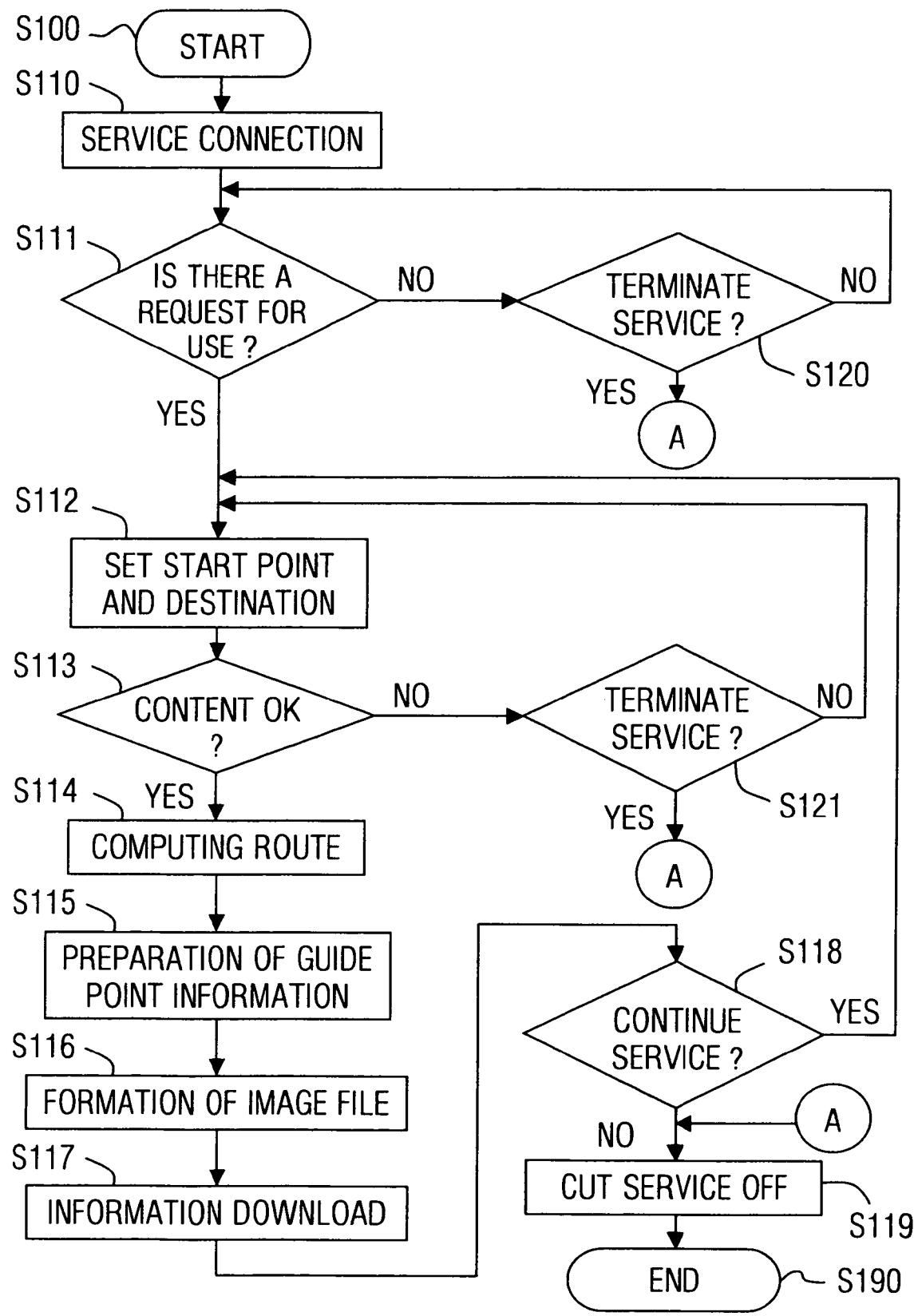
FIG. 2 is a flow chart of process flow for providing the guidance information by the service provider in the navigation system shown in FIG. 1.

FIG. 2 is a flow chart illustrating the processing flow in providing the guidance information from service provider 20 to information terminal 100. FIG. 3 is a diagram illustrating the processing.

For example, the user of vehicle 10 accesses the web site of service provider 20 from information terminal 100 via network 90. As a result, information terminal 100 is connected to service provider 20 so that service provider can provide service (step S110).

Upon being accessed by information terminal 100, service provider 20 judges whether there is a request from information terminal 100 for route guidance information (step S111). If there is no request for route guidance information (NO in step S111), a judgment is made as to whether the user has terminated the service access (step S120). If it has been terminated (YES in step S120), the access from information terminal 100 is cut off (step S119), and the information terminal 100 processing comes to an end (step S190).

On the other hand, if the service (access) has not been terminated in step S120 (NO in step S120), process flow returns to step S111, and the presence/absence of a request to use the service of providing route guidance information is checked.

As a result, service provider 20 stands by for a request from information terminal 100 to use the service of providing route guidance information.

When there is a request for route guidance information from information terminal 100 (YES in step S111), the user is prompted to input the starting point and destination to information terminal 100, and the input starting point and destination information is received and set (step S112). Also, for example, when service provider 20 knows the current position of vehicle 10 for some reason, such as that service provider 20 has already provided the route guidance information to vehicle 10, etc., the current position information is used as the starting point, and its input from information terminal 100 can be omitted.

The user is then prompted to check the starting point and destination settings (step S113). If a successful check has been made (OK, that is, YES in step S113), process flow continues to the processing of the next step, that is, computing of the route. On the other hand, if the set starting point and destination are incorrect (NG, that is, NO in step S113), a judgment is made as to whether the user has terminated the service (step S121). If the user has terminated the service (YES in step S121), access from information terminal 100 is cut off (step S119), and the processing with respect to information terminal 100 comes to an end (step S190). If the service (access) is not terminated in step S121 (NO in step S121), process flow returns to step S112, and a request is made to information terminal 100 for input of the starting point and destination again.

In the route computing processing, based on the set starting point and destination information, route computing module 230 of service provider 20 uses the information of map database 220 as a reference, or uses other preset conditions, etc., as a reference, to determine the route from the starting point to the destination (step S114). In this embodiment, it is assumed that one route is determined as the route that connects the starting point and destination. However, plural routes can be determined simultaneously.

Figure 3:
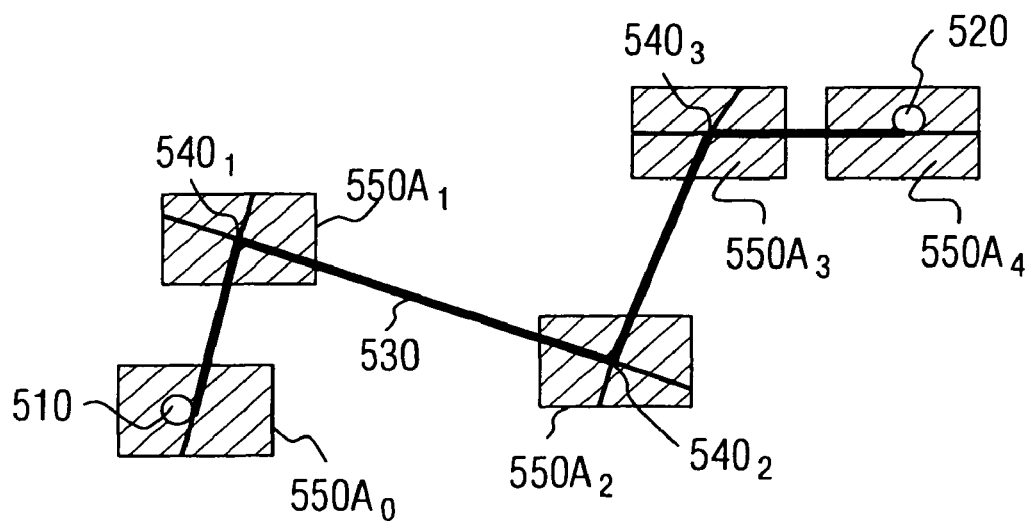
FIG. 3 is a diagram illustrating representation of a route in accordance with the processing shown in FIG. 2.

For example, as shown in FIG. 3, when starting point 510 and destination 520 are set by the user, one route 530 is determined by the route computation of step S114.

Once the route from the starting point to the destination is determined, left/right turning and other guidance point information are prepared from this result (step S115. Here, the guidance point information includes the latitude and longitude of the location where left/right turning, etc., is in order. Here, the guidance point information becomes the step-by-step information for travel from the starting point to the destination.

In the example shown in FIG. 3, for starting point 510, destination 520 and route 530, right/left turn sites $540_1$, $540_2$, and $540_3$ are determined as guidance points. The latitude and longitude information for the guidance points and the information of the connecting routes roads between them are determined as information for the guidance points.

Then, based on the obtained guidance point information, an image file is formed that includes the map information near each guidance point. The image data generation module 240 of service provider 20 extracts map image information from map database 220 at a prescribed scale and having the destination and the various guidance points at the centers, and the road that becomes the route of the extracted map is depicted as a wide line or in a different color, so that the determined route information is superimposed on the map image to generate map image guidance information. Then, image data generation module 240 takes the generated map image information as an image file in a general purpose still picture format, such as JPEG or GIF or the like, and attaches the latitude and longitude information and scale information of the central portion of the image guidance point to the image file, forming the image file for download to information terminal 100.

In the example shown in FIG. 3, map images $550A_0$, $550A_1$, $550A_2$, $550A_3$ and $550A_4$, with starting point 510, destination 520 and the guidance points $540_1$, $540_2$ and $540_3$ at their centers, are respectively extracted, and the latitude and longitude and scale information are attached to each of them to form an image file group for download.

The service provider 20 has a series of image file groups for each guidance point downloaded to information terminal 100 (step S117).

Also, in computing the route S114, when plural routes are determined for connecting the starting point and destination, an image file group is generated for each of the routes.

Then, if the user demands further service (YES in step S118), process flow returns to step S112, and the user is prompted to input the starting point and destination of the next route guidance object. On the other hand, if there is no demand for further service (NO in step S118), access from information terminal 100 is cut off (step S119), and the processing for information terminal 100 is terminated (step S190).

In the following, an explanation will be given regarding the operation in which the obtained guidance information is used in information terminal 100 and the driver of vehicle 10 is guided on the route from the starting point to the destination with reference to FIGS. 4-7 and FIG. 3.

Figure 4A:
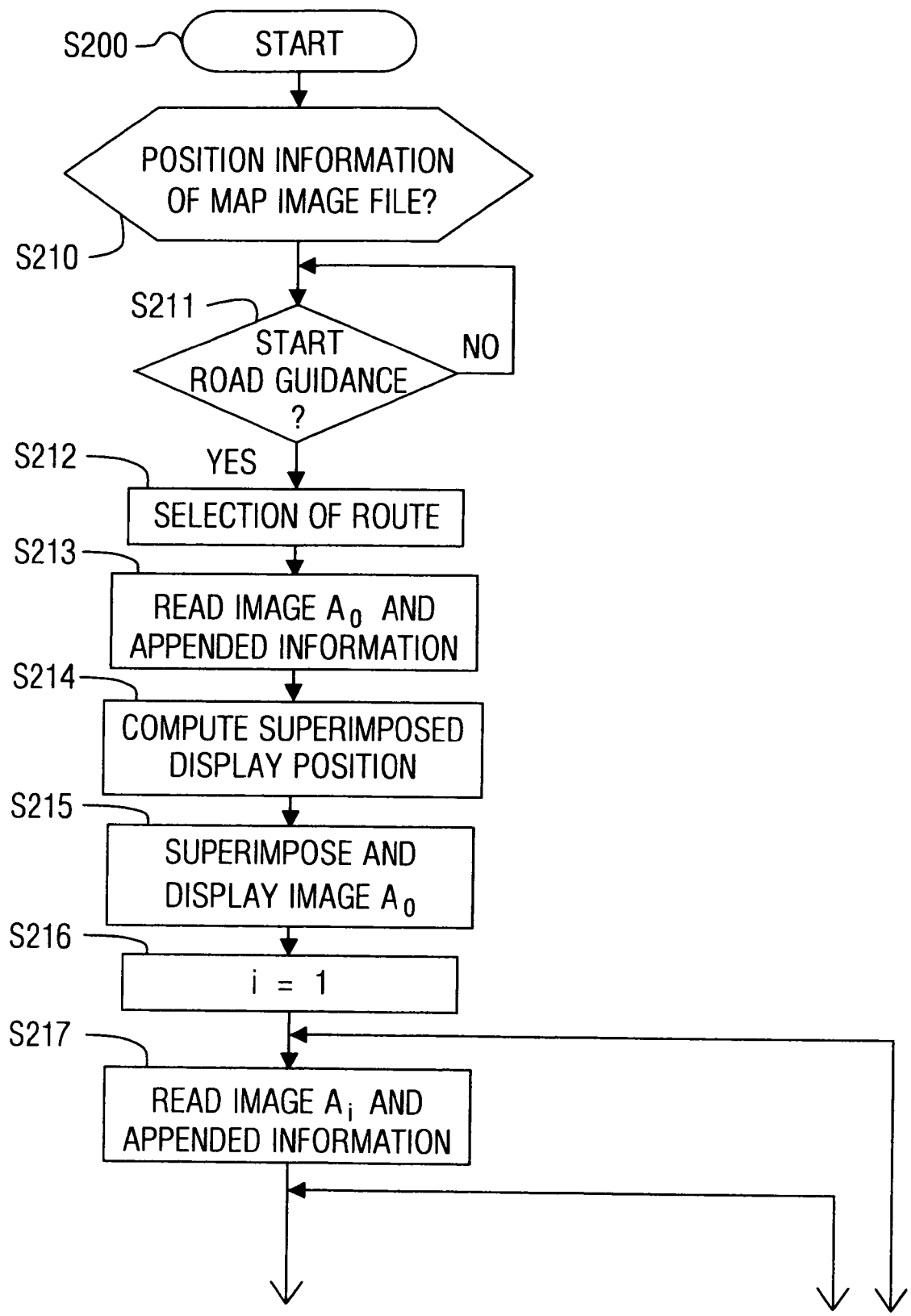
FIGS. 4A and 4B are a first flow chart illustrating the processing flow for guiding the driver of the vehicle to the destination with the information terminal of the vehicle in the navigation system shown in FIG. 1.
Figure 4B:
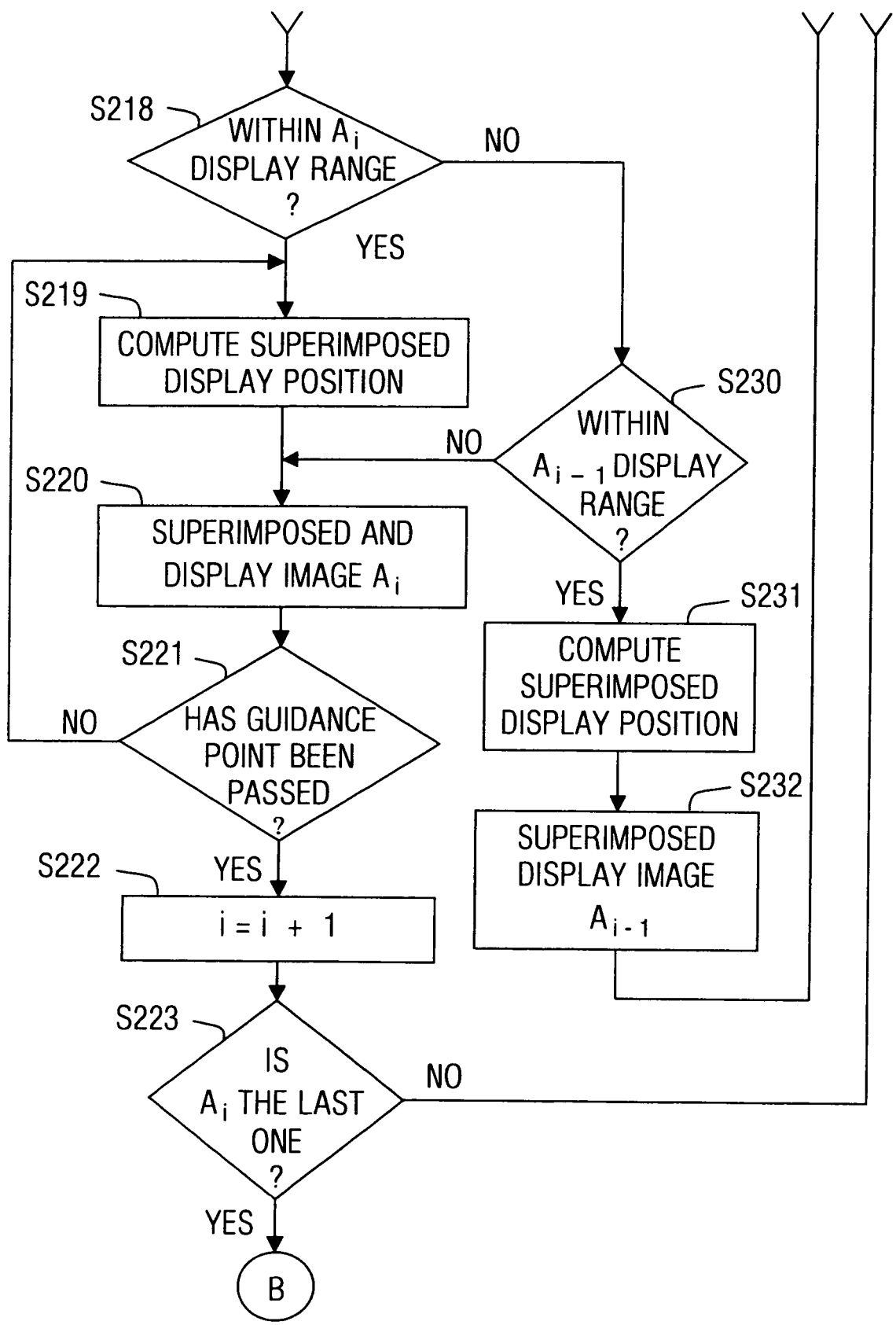

FIGS. 4 and 5 are flow charts illustrating the processing flow for guiding the driver of vehicle 10 from the starting point to the destination at information terminal 100. FIGS. 6 and 7 are diagrams illustrating examples of display during this processing on display module 120 of information terminal 100 of vehicle 10.

When the driver of vehicle 10 turns ON the ignition key or turns ON the power supply for information terminal 100, information terminal 100 begins operation (step S200).

As information terminal 100 operates, first of all, the guidance information provided by service provider 20 is stored in storage module 170 of information terminal 100 by means of the processing (step S210).

Also, as information terminal 100 operates, position information acquisition module 150 begins operation. Then, within a prescribed time interval, the position information for vehicle 10, that is, its latitude and longitude, is determined (step S210). In the following processing, when the position information for vehicle 10 is used, the most current position information for vehicle 10 determined by position information acquisition module 150 is used. The position information for vehicle 10 is determined on a regular basis in position information acquisition module 150 and the most current information is used. This will not be explained below.

Information terminal 100 then stands by for the driver of vehicle to start the route guidance operation 10 (step S211).

When route guidance is started by the user (YES in step S211), a list of the route information stored in storage module 170 is displayed on display module 120, and the user can select the information for the desired route to the desired destination from the list (step S212).

In the following, an explanation will be given regarding the selection in step S212 of route 530 from starting point 510 to destination 520, as shown in FIG. 3.

Once the guiding route is selected, arithmetic operation module 110 reads the image file of image $550A_0$ of the starting point of selected route 530 and its appended information from storage module 170 (step S213).

Figure 6A:
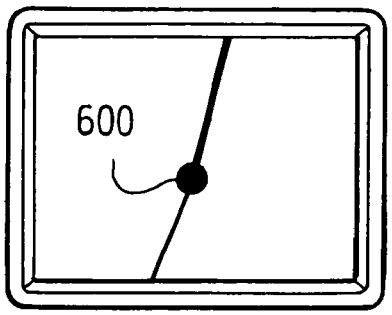
FIGS. 6A through 6D are diagrams of an image displayed on the display module of the information terminal of the vehicle according to the processing shown FIGS. 4A, 4B and 5.
Figure 6B:
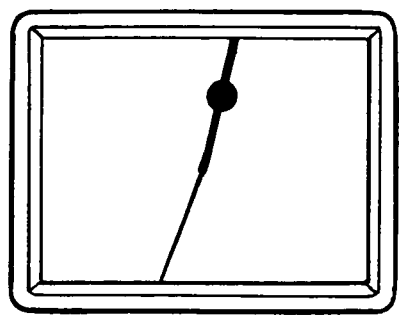

Then, from the latitude and longitude information for the image central portion and the image scale information that are appended and from the current position information of vehicle 10 detected by position information acquiring module 150, arithmetic operation module 110 performs a computation to determine where vehicle 10 is located on image $550A_0$ (step S214), superimposes an indicia 600 (See FIG. 6A) indicating the position of vehicle 10 on image $550A_0$ by means of display image generation module 130, and displays it on display module 120 (step S215). As a result, as shown in FIG. 6A, the image of the periphery of starting point 510 (see FIG. 3) is displayed on display module 120. Also, in the image display examples shown in FIGS. 6 and 7, the dots indicate the position of vehicle 10. Alternatively, other types of symbols or other indicia may be use to indicate the position of vehicle 10.

Then, index i of the image file is initialized (i=1) (step S216), and the image file for image 550Ai corresponding to the next guidance point (the ith guidance point) and its appended information are read from storage module 170 (step S217).

From the latitude and longitude information for the image central portion and the image scale information that are appended, as well as the current position information for vehicle 10 determined by position information acquisition module 150, arithmetic operation module 110 judges the presence/absence of vehicle 10 within the range of image 550Ai (step S218).

If vehicle 10 is out of the range of image 550Ai (NO in step S218), a judgment is made as to whether vehicle 10 is present within the range of the image of the preceding guidance point the currently displayed image 550Ai-1 (step S230).

If vehicle 10 is in the display range of image 550Ai-1 of the preceding guidance point (YES in step S230), the position of vehicle 10 on image $550A_0$ is computed from the latitude and longitude information for the image central portion and the image scale information that are appended to the image file of the image 550Ai-1 and the current position information for vehicle 10 determined by position information acquisition module 150, (step S231), and the position of vehicle 10 is superimposed on image 550Ai-1 and displayed on display module 120 by means of display image generation module 130 (step S232). As a result, an image is displayed on display module 120 such as that shown in FIG. 6B for i=1 as an example. In other words, compared to the preceding display image, the image displayed is still image $550A_0$ without change, and the position of vehicle 10 moves on the displayed image.

After the display, process flow returns to step S218, and a judgment is made as to the presence/absence of vehicle 10 within the range of image 550Ai. The processing after that is repeated.

When vehicle 10 is not within the range of image 550Ai-1 of the preceding guidance point in step S230 (NO in step S230), image 550Ai of the ith guidance point that is expected to come next (to enter the range) is displayed (step S220). In this case, because vehicle 10 is out of the range of image 550Ai, the dot indicating the position of vehicle 10 is not superimposed in display.

Figure 6C:
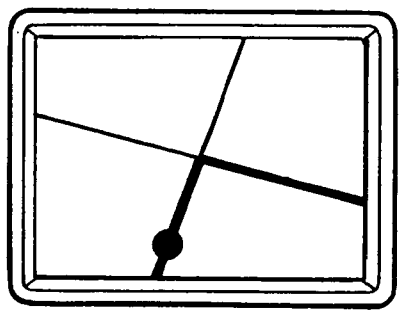

When vehicle 10 enters the range of image 550Ai of the ith guidance point (YES in step S218, the latitude and longitude information for the image central portion and the image scale information appended to the image file for image 550Ai and the current position information for vehicle 10 determined by position information acquisition module 150 are used to compute the position of vehicle 10 in image 550Ai (step S219), and the position of vehicle 10 is superimposed on image 550Ai by display image generation module 130 and displayed on display module 120 (step S220). As a result, for i=1 as an example, the image shown in FIG. 6C is displayed on display module 120. In other words, compared to the preceding image displayed, the displayed image is changed to image 550Ai of the next arriving guidance point, and when vehicle 10 approaches the intersection as the guidance point, its position is shown as a dot on the displayed image.

Once this display is made, a judgment is made as to whether vehicle 10 has passed the ith guidance point (step S221).

A judgment as to whether the guidance point has been passed can be easily performed by determining the distance between vehicle 10 and the guidance point based on the vehicle position information and the latitude and longitude information for the guidance point. This distance diminishes as vehicle 10 approaches the guidance point, becomes nearly 0 zero when the vehicle reaches the guidance point, and then increases after passing it. It is then possible to judge whether the guidance point has been passed by determining the zero point.

When the ith guidance point has not yet been passed (NO in step S221), process flow returns to step S219, and the position of vehicle 10 on image 550Ai is computed from the information appended to the image file of image 550Ai and the current position information for vehicle 10 (step S219), and the position of vehicle 10 is superimposed on image 550Ai by display image generation module 130 and is displayed on display module 120 (step S220). As a result, the image displayed on display module 120 is the same as the preceding image 550Ai, and the position of vehicle 10 is moved to display the same image as that shown in FIG. 6C.

In step S221, it is determined that the guidance point has been passed by vehicle 10, the variable i as the index for the guidance point is incremented (step S222), and the ith image 550Ai is set to become the image of the next guidance point.

Figure 6D:
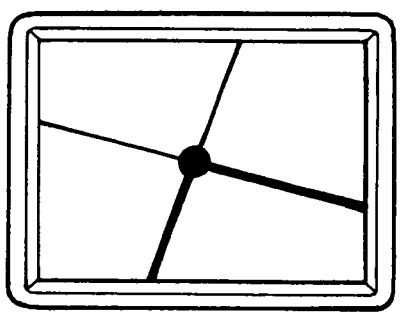

The image displayed on display module 120 when vehicle 10 passes through the guidance point is the same as that shown in FIG. 6D.

When the guidance point is passed and variable i is incremented, a judgment is made as to whether the next guidance point (ith guidance point) is the last guidance point, that is, the destination (step S223).

If the next guidance point is not the last guidance point (NO in step S223), process flow returns to step S217, and the processing of steps S217-S222 is repeated.

Figure 7A:
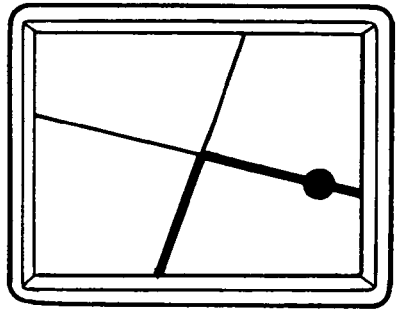
FIGS. 7A through 7D are diagrams of an image displayed on the display module of the information terminal of the vehicle according to the processing shown FIGS. 4A, 4B and 5.
Figure 7B:
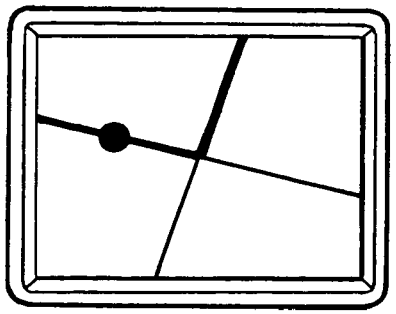
Figure 7C:
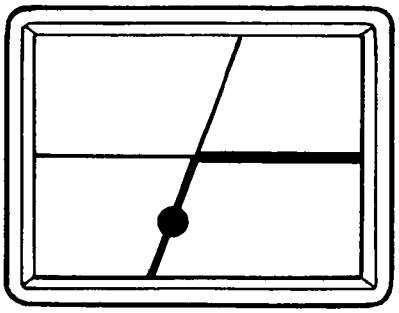

As a result, one of the following images is displayed on display module 120 of vehicle 10, depending on the specific state: an image indicating the state as the vehicle moves away from the first guidance point $540_1$ as shown in FIG. 7A, an image indicating the state as the vehicle approaches the second guidance point $540_2$ as shown in FIG. 7B, or an image indicating the state as the vehicle approaches the third guidance point $540_3$, etc.

When the next guidance point (the ith guidance point) is the last guidance point, that is, the destination (YES in step S223), first of all, the image file for image 550Ai corresponding to the guidance point (destination) and its appended information are read from storage module 170 (step S240 see FIG. 5).

The arithmetic operation module 110 judges whether vehicle 10 is present within the range of image 550Ai based on the latitude and longitude information for the image central portion and the image scale information that is appended and the current position information for vehicle 10 determined by position information acquisition module 150 (step S241).

If vehicle 10 is not within the range of image 550Ai (NO in step S241), a judgment is made as to whether vehicle 10 is within the range of image 550Ai-1 the current displayed image of the preceding guidance point (step S250).

If vehicle 10 is within the range of the display of image 550Ai-1 of the preceding guidance point (YES in step S250), the position of vehicle 10 on image 550Ai-1 is computed from the latitude and longitude information for the image central portion and the image scale information appended to the image file for image 550Ai-1 and the current position information for vehicle 10 determined by position information acquisition module 150 (step S251). The position of vehicle 10 is superimposed on image 550Ai-1 by display image generation module 130 and displayed on display unit 120 (step S252).

After the display, process flow returns to step S241, and a judgment is made from the information appended to image 550Ai and the current position information for vehicle 10 as to whether vehicle 10 is present within the range of image 550Ai, and the processing thereafter is repeated.

When vehicle 10 is present within the range of image 550Ai-1 of the preceding guidance point (NO in step S250), image 550Ai of the destination (the ith guidance point) is displayed (step S243). In this case, because vehicle 10 is out of the range of image 550Ai, the dot indicating the position of vehicle 10 is not superimposed and displayed.

Figure 7D:
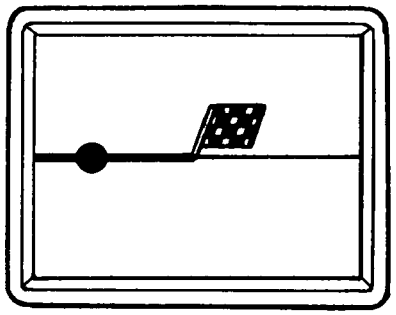

When vehicle 10 enters the range of image 550Ai of the destination (ith guidance point) (YES in step S241), the position of vehicle 10 in image 550Ai is computed from the latitude and longitude information for the image central portion and the image scale information appended to the image file for image 550Ai and the current position information for vehicle 10 on image 550A determined by position information acquisition module 150 (step S242), and the position of vehicle 10 is superimposed on image 550Ai by display image generation module 130 and is displayed on display module 120 (step S243). As a result, the same image as that shown in FIG. 7D is displayed on display module 120.

After the display, a judgment is made as to whether vehicle 10 has reached the destination (ith guidance point) (step S244). The judgment on whether vehicle 10 has reached the destination can be performed, for example, by determining whether the distance between the vehicle 10 and the guidance point is 0 zero from the position information for vehicle 10 and the latitude and longitude information for the guidance point.

If vehicle 10 has not reached the destination (NO in step S244), process flow returns to step S242. The position of vehicle 10 on image 550Ai is computed (step S242), and the position of vehicle 10 is superimposed on image 550Ai by display image generation module 130 and displayed on display module 120 (step S243). As a result, the same image is displayed on display module 120 as the preceding image 550Ai, except that the position of vehicle 10 has been moved.

Then, in step S244, if it is determined that vehicle 10 has reached the destination, the route guidance processing sequence comes to an end (step S290).

In this way, as shown in FIG. 3, navigation system 1 of this embodiment downloads to information terminal 100 and stores image data near the destination, the intersections where the vehicle turns left/right, and other guidance points. Other image data may be omitted, and in this manner, the amount of map image data files may be reduced while still providing route guidance to the user by means of map images used for general navigation.

As a result, compared to the conventional step-by-step navigation system, the driver of vehicle 10 can be guided on the route in a more easily understood fashion.

Figure 8:
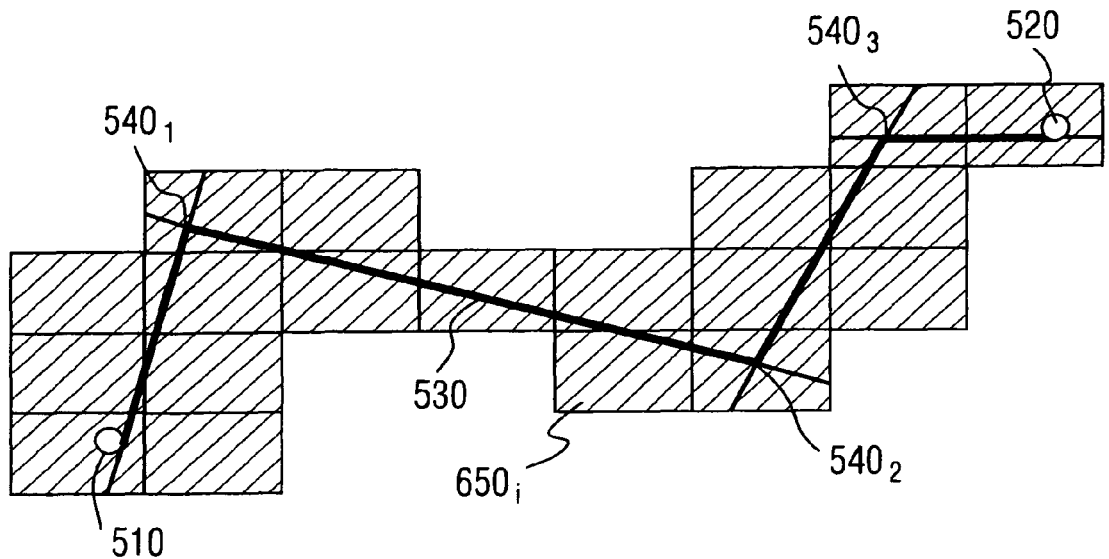
FIG. 8 is a diagram illustrating representation of a map route wherein map portions of the entire route are provided.

When map information is used over the entire region of the guiding route, the required map image information becomes the region shown in FIG. 8. As can be seen from a comparison between FIG. 3 and FIG. 8, the amount of map image information downloaded is much smaller in navigation system 1 of this embodiment. Consequently, there is no need for a large-capacity storage component for information terminal 100, and the advantage of the simple constitution of a step-by-step navigation system can be maintained.

That is, in navigation system 1 of the present embodiment, while the advantage of a step-by-step navigation system can be maintained, that is, reducing the provision of excessive information such as map information at locations where the vehicle can simply continue along the road, the minimum necessary general purpose still image files can be used to provide the user with a guide at the guidance points in the form of a map image adopted for conventional navigation. Consequently, more effective step-by-step navigation can be realized for better practical application.

In order to simplify the explanation of the image display example shown in FIGS. 6 and 7, only the road information pertaining to the route is shown. However, the displayed map image is a map image stored in map database 220 of service provider 20, and it can also display other roads, peripheral landmarks, etc. Also, it is of course possible to superimpose and display the display scale information (map scale).

With regard to the timing for switching from the (i-1)th image (the image of the guidance point that has been passed) to the ith image (the image of the next guidance point) in the navigation system 1, the following schemes can be adopted:

(1) Switching can be performed when vehicle 10 is out of the range of the (i-1)th map image (the image of the surroundings of the guidance point that has been passed) (NO in step S230 see FIG. 4).

(2) Switching can be performed when vehicle 10 approaches within a prescribed distance of the ith guidance point the next guidance point.

(3) Switching can be performed when the position of vehicle 10 enters the display range of the ith map image.

(4) Switching can be performed when vehicle 10 has passed the (i-1)th guidance point.

Second Embodiment

In the following, an explanation will be given regarding the second embodiment of the present invention, with reference to FIGS. 9-13.

In the second embodiment, as well, the present invention will be explained with reference to an example of a step-by-step navigation system that is carried aboard the vehicle and guides the driver of the vehicle from the starting point to the destination.

The same part numbers as those in the first embodiment are adopted to represent the constitution and contents in the following explanation and reference figures that are the same as in the first embodiment, and explanations will not be repeated. Only features different from those of the first embodiment will be explained.

In navigation system 1 of the first embodiment, image data necessary for guidance, such as right/left turning, etc., is downloaded from service provider 20 to information terminal 100 of vehicle 10. Consequently, during the period from the time when vehicle 10 leaves the display range of image 550Ai-1 (see FIG. 9); starting point 510, destination 520, route 530, and left/right guidance points $540_1$-$540_3$ of FIG. 9 are the same as those in FIG. 3 until it enters the display range of image 550Ai, the position of the vehicle itself is not superimposed on the image displayed on display module 120.

In the second embodiment, navigation system 1b (see FIG. 1) takes this into consideration. In this system, during the period from when vehicle 10 leaves the display range of image 550Ai-1 including the (i-1)th guidance point until it enters the display range of image 550Ai including the ith guidance point, the position of vehicle 10 is not superimposed on the map image of the expanded range including the (i-1)th guidance point and the ith guidance point displayed on display module 120 of terminal 100.

The constitution of navigation system 1b is similar to that of navigation system 1 of the first embodiment shown as example in FIG. 1, except that the image is generated in image data generation module 240 of service provider 20.

Figure 9:
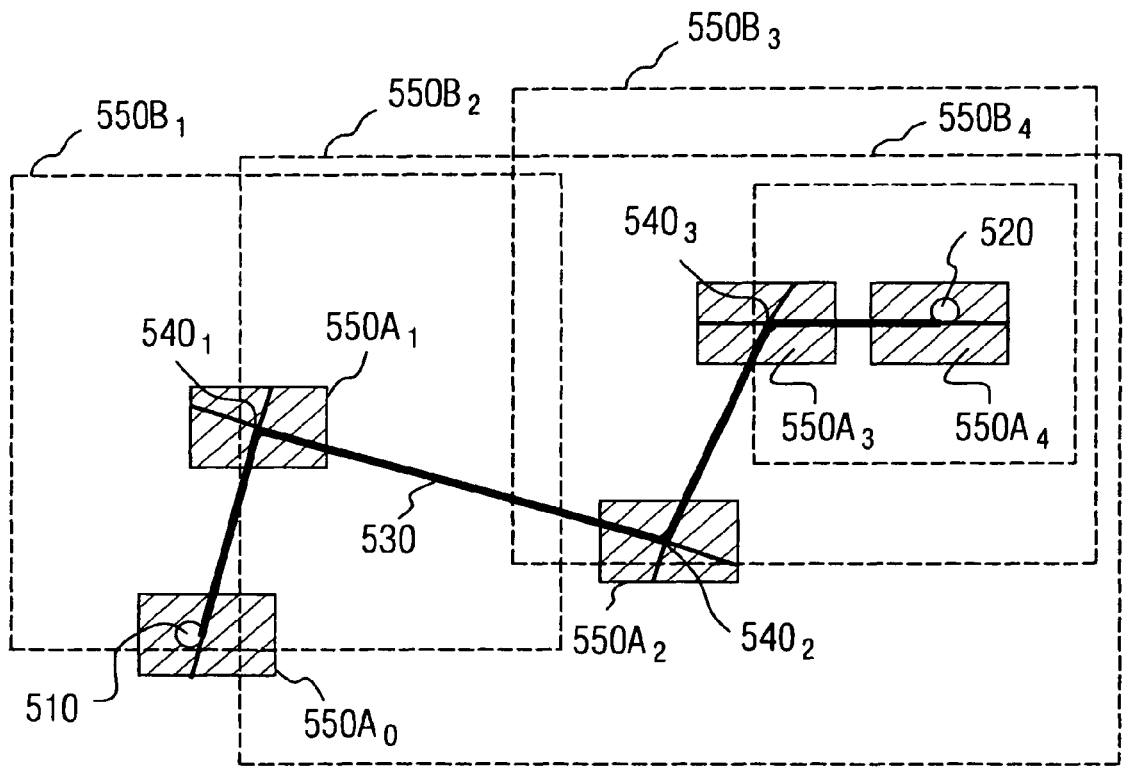
FIG. 9 is a diagram illustrating representation of a route in accordance with a second embodiment of the present invention.

After service provider 20 of navigation system 1b computes the route to the destination in route computing module 230, image data corresponding to the various guidance points are formed in image data generation module 240, as shown in FIG. 9, and in addition to the group of images 550A images $550A_0$-$550A_4$ of the surroundings of the guidance point just as in the first embodiment, a group of images 550B is also formed (images $550B_1$-$550B_3$) showing expanded-range map images that take the ith guidance point as the center and also include the (i-1)th guidance point.

The two image groups formed (images $550A_0$-$550A_4$ and images 550B1-550B3) are stored in temporary storage module 250, and are then downloaded to information terminal 100 of vehicle 10.

The operation and terminal for obtaining the route guidance information from service provider 20 by information terminal 100 of navigation systems 16 are similar to those in the aforementioned first embodiment with reference to FIG. 2, and will not be explained again. The novel feature is that the generated and downloaded map image information includes added information for an expanded-range image group 550B covering a range including two consecutive guidance points.

In information terminal 100 of navigation system 1b, the downloaded guidance information is used to guide the driver of vehicle 10 from the starting point to the destination. In the following, an explanation will be given regarding this operation, with reference to FIGS. 10-13.

Figure 10A:
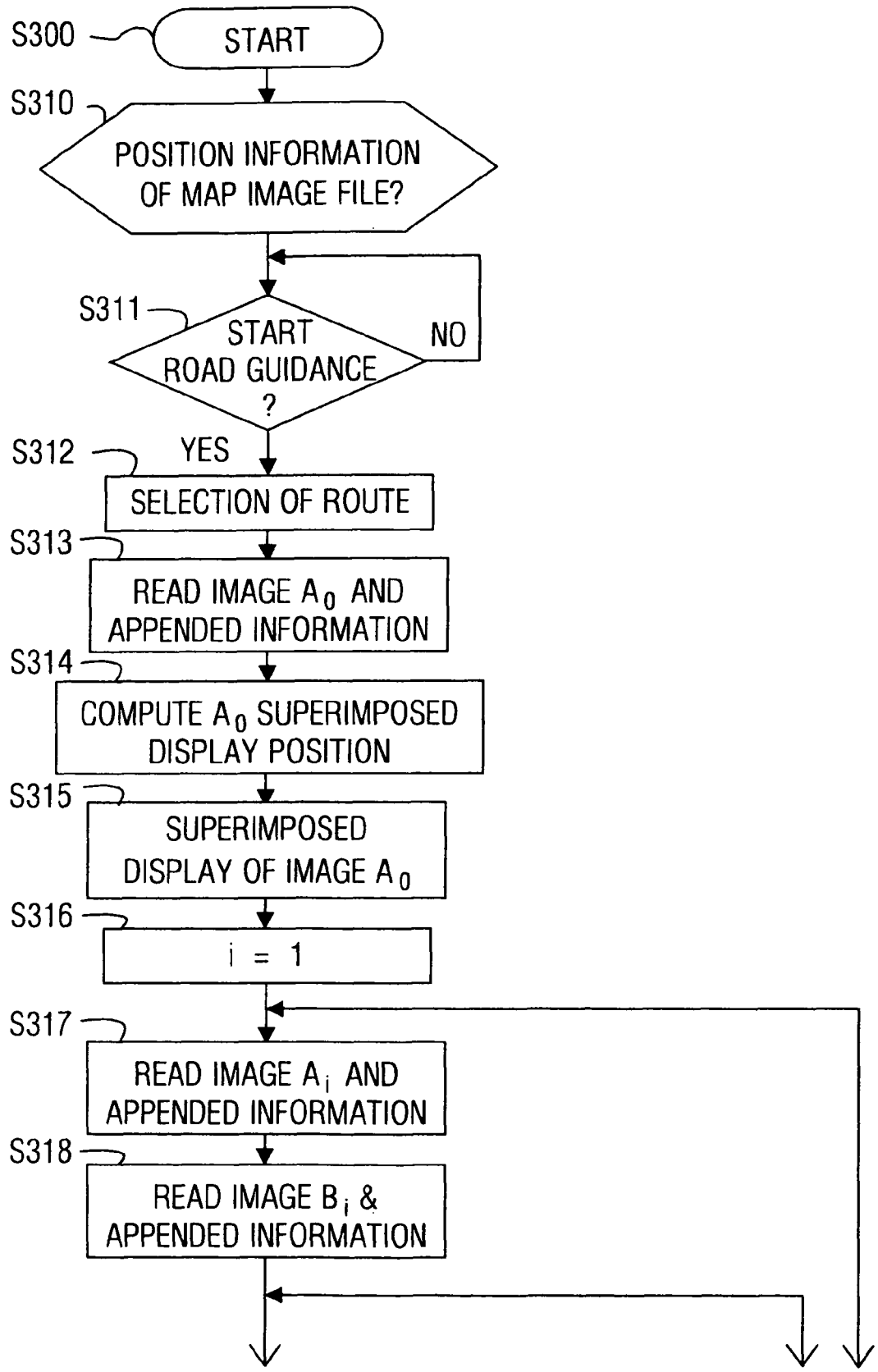
FIGS. 10A and 10B are a second flow chart illustrating the processing flow for guiding the driver of the vehicle to the destination with the information terminal of the vehicle in accordance with the second embodiment of the invention.
Figure 10B:
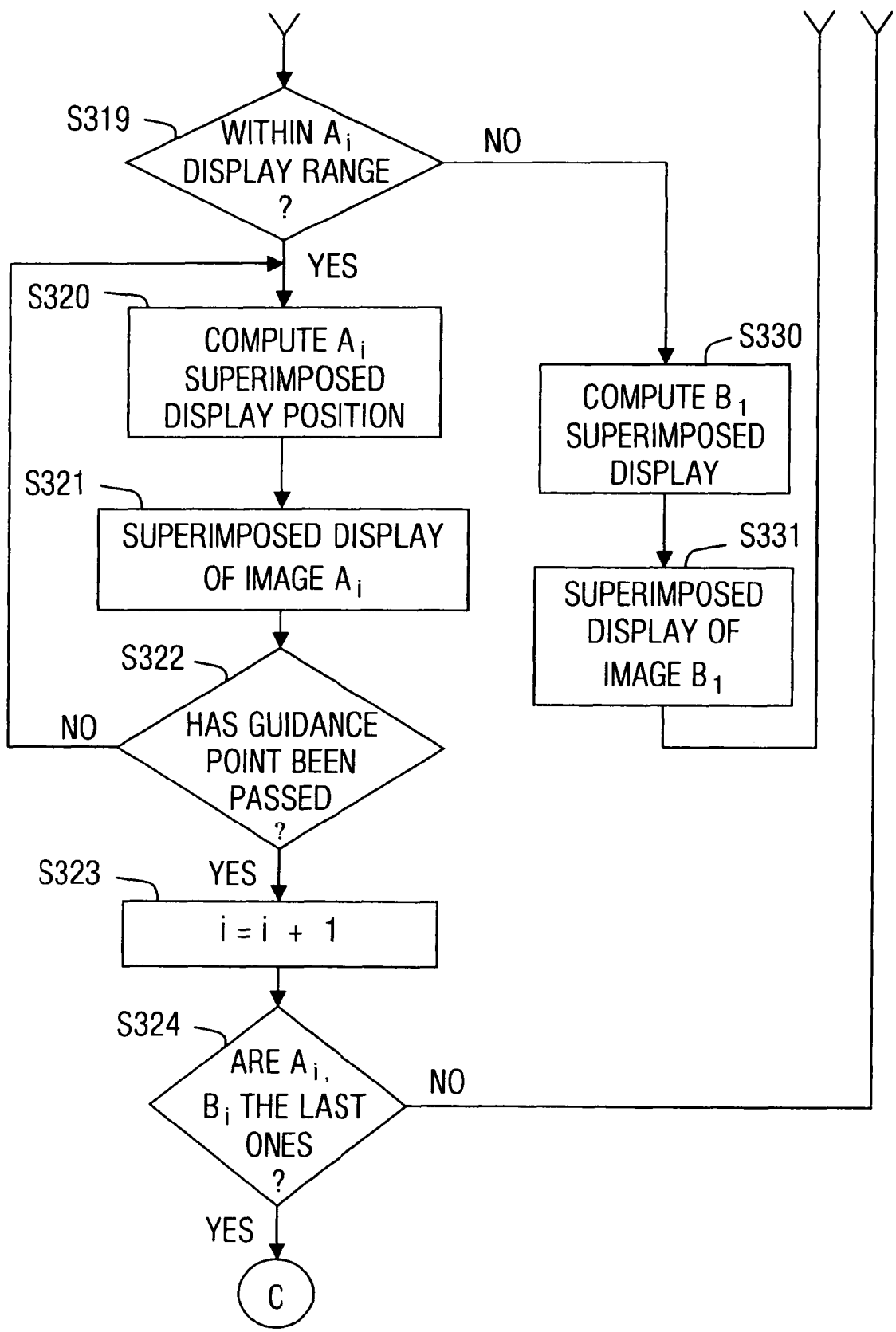
Figure 11:
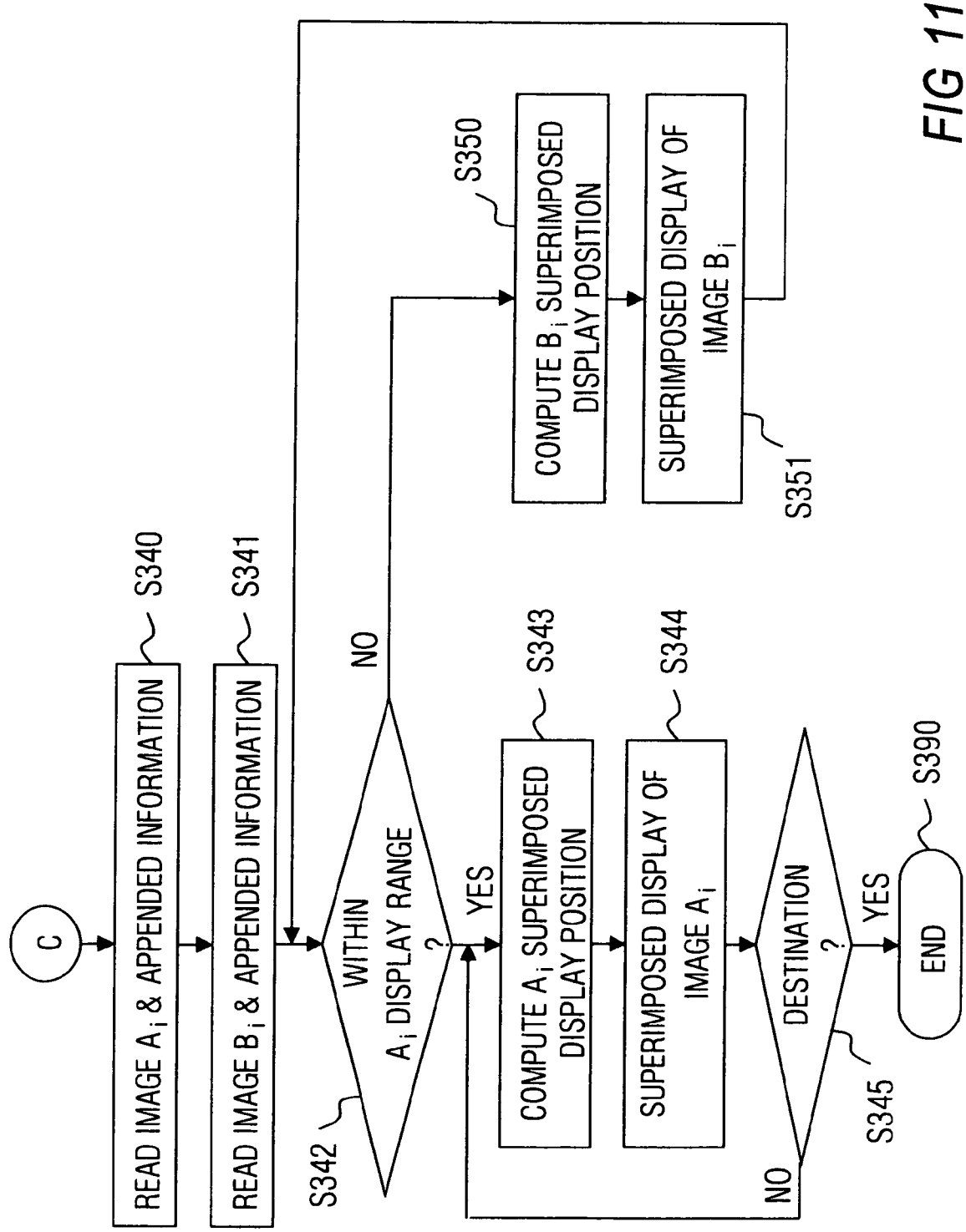
FIG. 11 is a continuation of the flow chart in FIGS. 10A and 10B.

FIGS. 10 and 11 are flow charts illustrating the processing in information terminal 100 for guiding the driver of vehicle 10 to the destination. FIGS. 12 and 13 are diagrams illustrating examples of displays on display module 120 of information terminal 100 of vehicle 10 according to this processing.

The processing of steps S300-S317 is the same as that of steps S200-S217 in navigation system 1 in the first embodiment, with reference to FIG. 4.

That is, when the driver of vehicle 10 turns ON the ignition key or turns ON the power supply for information terminal 100, information terminal 100 begins to operate (step S300), and the route guidance information from service provider 20 is stored in map image storage module 170 (step S310).

When the user initiates route guidance (step S311), the user selects the information for the desired destination (step S312), and arithmetic operation module 110 reads the image file of image 550A0 of the starting point of selected route 530 along with its appended information (step S313), and then computes the position of vehicle 10 in image $550A_0$ (step S314). It superimposes the position of vehicle 10 on image $550A_0$ and displays it on display module 120 (step S315).

Then, index i indicating the image file is initialized (i=1) (step S316), and the image file for image 550Ai corresponding to the next guidance point (the ith guidance point) and its appended information are read from storage module 170 (step S317).

The file for image 550Bi, with the ith guidance point at the center and containing the (i-1)th guidance point as well as its appended information, is then read from storage module 170 (step S318).

From the latitude and longitude information for the image central portion and the image scale information that are appended to image 550Ai, as well as from the current position information for vehicle 10 determined by position information acquisition module 150, arithmetic operation module 110 judges the presence/absence of vehicle 10 within the range of image 550Ai (step S318).

If vehicle 10 is out of the range of image 550Ai (NO in step S318), the latitude and longitude information for the image central portion and the image scale information appended to the image 550Bi, and the current position information for vehicle 10 determined by position information acquisition module 150, are used by arithmetic operation module 110 to compute the position of vehicle 10 in image 550Bi (step S330), and the position of vehicle 10 is superimposed on image 550Bi by display image generation module 130 and displayed on display module 120 (step S331). As a result, an image such as that shown in FIG. 12B is displayed on display module 120 for i=1 as an example.

After the display, process flow returns to step S319, and a judgment is made as to the presence/absence of vehicle 10 within the range of image 550Ai. The processing after that is repeated.

When vehicle 10 enters the display range of image 550Ai (YES in step S319), the latitude and longitude information for the image central portion and the image scale information that is appended to the image file for image 550Ai, and the current position information for vehicle 10 determined by position information acquisition module 150, are used to compute the position of vehicle 10 in image 550Ai (step S320), and the position of vehicle 10 is superimposed on image 550Ai by display image generation module 130 and displayed on display module 120 (step S321). As a result, the image shown in FIG. 12C is displayed on display module 120 for i=1 as an example.

After the display is made, a judgment is made as to whether vehicle 10 has passed the ith guidance point (step S322).

A judgment on whether the guidance point has been passed can be performed easily by determining the distance between vehicle 10 and the guidance point from the position information for the vehicle and the latitude and longitude information for the guidance point.

When the ith guidance point has not yet been passed (NO in step S322), process flow returns to step S320, the information appended to the image file for image 550Ai and the current position information for vehicle 10 are used to compute the position of vehicle 10 in image 550Ai (step S320). The position of vehicle 10 is superimposed on image 550Ai by display image generation module 130 and displayed on display module 120 (step S321).

In step S322, if it is detected has that vehicle 10 passed the guidance point, the variable i indexing the guidance point is incremented (step S323), and the ith image 550Ai is set to become the image of the next guidance point.

When the guidance point is passed and variable i is incremented, a judgment is made as to whether the next guidance point (the ith guidance point) is the last guidance point, that is, the destination (step S324).

If the next guidance point is not the last guidance point (NO in step S324), process flow returns to step S317, and the processing of steps S317-S323 is repeated.

As a result, the following images are sequentially displayed on display module 120 of vehicle 10: the image in which the position of vehicle 10 that moves between first guidance point 540, and second guidance point $540_2$ is superimposed on image $550B_2$ that contains both of these guidance points, as shown in FIG. 12D; the image in which the position of vehicle 10 that moves towards image $550A_2$ near second guidance point $540_2$ is superimposed on the image, as shown in FIG. 13A; the image in which vehicle 10 that moves between second guidance point $540_2$ and third guidance point $540_3$ is superimposed on image $550B_3$ containing both the guidance points, as shown in FIG. 13B; and the image in which the position of vehicle 10 that moves towards third guidance point $540_3$ is superimposed on image $550A_3$, as shown in FIG. 13C.

When the next guidance point (the ith guidance point) is the last guidance point, that is, the destination (YES in step S324), first of all, the image file for image 550Ai corresponding to the guidance point (destination) and its appended information are read from storage module 170 (step S340 (see FIG. 11)). The file for image 550Bi containing the (i-1)th guidance point at its center and its appended information is then read from storage module 170 (step S341).

The arithmetic operation module 110 then judges whether vehicle 10 is present within the range of image 550Ai from the latitude and longitude information for the image central portion and the image scale information as the appended information for image 550Ai, and the current position information for vehicle 10 determined by position information acquisition module 150 (step S342).

If vehicle 10 is not within the range of image 550Ai (NO in step S342), from the latitude and longitude information for the image central portion and the image scale information as appended to the image file for image 550Bi, and the current position information for vehicle 10 determined by position information acquisition module 150, arithmetic operation module 110 computes the position of vehicle 10 in image 550Bi (step S350), and the position of vehicle 10 is superimposed on image 550Bi by display image generation module 130 and displayed on display module 120 (step S351). As a result, the image shown in FIG. 13D is displayed on display module 120 for the case of i=1.

After the display, process flow returns to step S342, and a judgment is made as to whether vehicle 10 is present within the range of image 550Ai, and the processing thereafter is repeated.

When vehicle 10 is present within the range of image 550Ai of the preceding guidance point (YES in step S342), the latitude and longitude information for the image central portion and the image scale information as appended to the image file for image 550Ai and the current position information for vehicle 10 determined by position information acquisition module 150 are used to compute the position of vehicle 10 in image 550Ai (step S343), and the position of vehicle 10 is superimposed on image 550Ai by display image generation module 130 and displayed on display module 120 (step S344).

After this display, a judgment is made as to whether vehicle 10 has reached the destination (ith guidance point) (step S345). The judgment on whether vehicle 10 has reached the destination can be performed, for example, by determining whether the distance between the vehicle and the guidance point is 0 from the position information for vehicle 10 and the latitude and longitude information for the guidance point.

If vehicle 10 has not reached the destination (NO in step S345), process flow returns to step S343. The position of vehicle 10 in image 550Ai is computed (step S343), and the position of vehicle 10 is superimposed on image 550Ai by display image generation module 130 and displayed on display module 120 (step S344). As a result, the same image as the preceding image 550Ai is displayed on display module 120, except that the position of vehicle 10 has been moved.

Then, in step S345, if it is determined that vehicle 10 has reached the destination, the route guiding processing sequence comes to an end (step S390).

In this way, as shown in FIG. 3, navigation system 1b of this embodiment downloads to information terminal 100 and stores image data near the destination, the intersections where the vehicle turns left/right and other guidance points. As a result, the driver of vehicle 10 can be guided on the route in a more easily understandable fashion, with guiding being performed by periodically reminding the driver of the position of the vehicle.

Also, although the quantity of image data used in this case is a little larger than that of navigation system 1 in the first embodiment, when a comparison is made to the use of map information over the entire region of the guidance points, as shown in FIG. 8, or with a multi-functional navigation system (that does not use the step-by-step system) as is widely used in Japan, the quantity of image data used is much smaller. Consequently, just as in navigation system 1 of the first embodiment, there is no need for a large-capacity storage component for information terminal 100, and the advantage of a simple constitution of a step-by-step navigation system can be maintained.

In the image display example shown in FIGS. 12 and 13, only the road information pertaining to the route is shown in order to simplify the explanation. However, it is also possible in practice to display the other roads and targets around the vehicle, and it is naturally possible to superimpose and display the display scale information map scale.

Also, as explained above, the expanded-range image 550Bi is established with the ith guidance point at its center. However, as long as the map image simultaneously contains both the (i-1)th guidance point and the ith guidance point, the scheme is not limited to this central point.

Alternative Embodiments

Examples have been described in these embodiments in order to facilitate understanding of the present invention. However, the present invention is not limited to these examples. The various elements disclosed in the present embodiments allow changes in design and the use of equivalent modules as long as the technical scope of the present invention is observed, and various advantageous modifications are allowed.

In the first and second embodiments, the navigation system carried in the vehicle serves to guide the driver of the vehicle to a destination. However, the navigation system of the present invention is not limited to use in vehicles. For example, the constitution may be used in cell phones or small computer devices to guide the user to a destination. The present invention can be adopted in any information equipment that can be transported.

In the first and second embodiments, navigation system 1 (see FIG. 1) has a constitution in which information terminal 100 is directly connected to the service provider. However, the present invention is not limited to this scheme. For example, the following scheme can also be adopted: the information from service provider 20 is received by means of a device different from information terminal 100, and the information is transferred via a storage medium to information terminal 100. Then, the same navigation processing is performed in information terminal 100 as was previously described.

Figure 14:
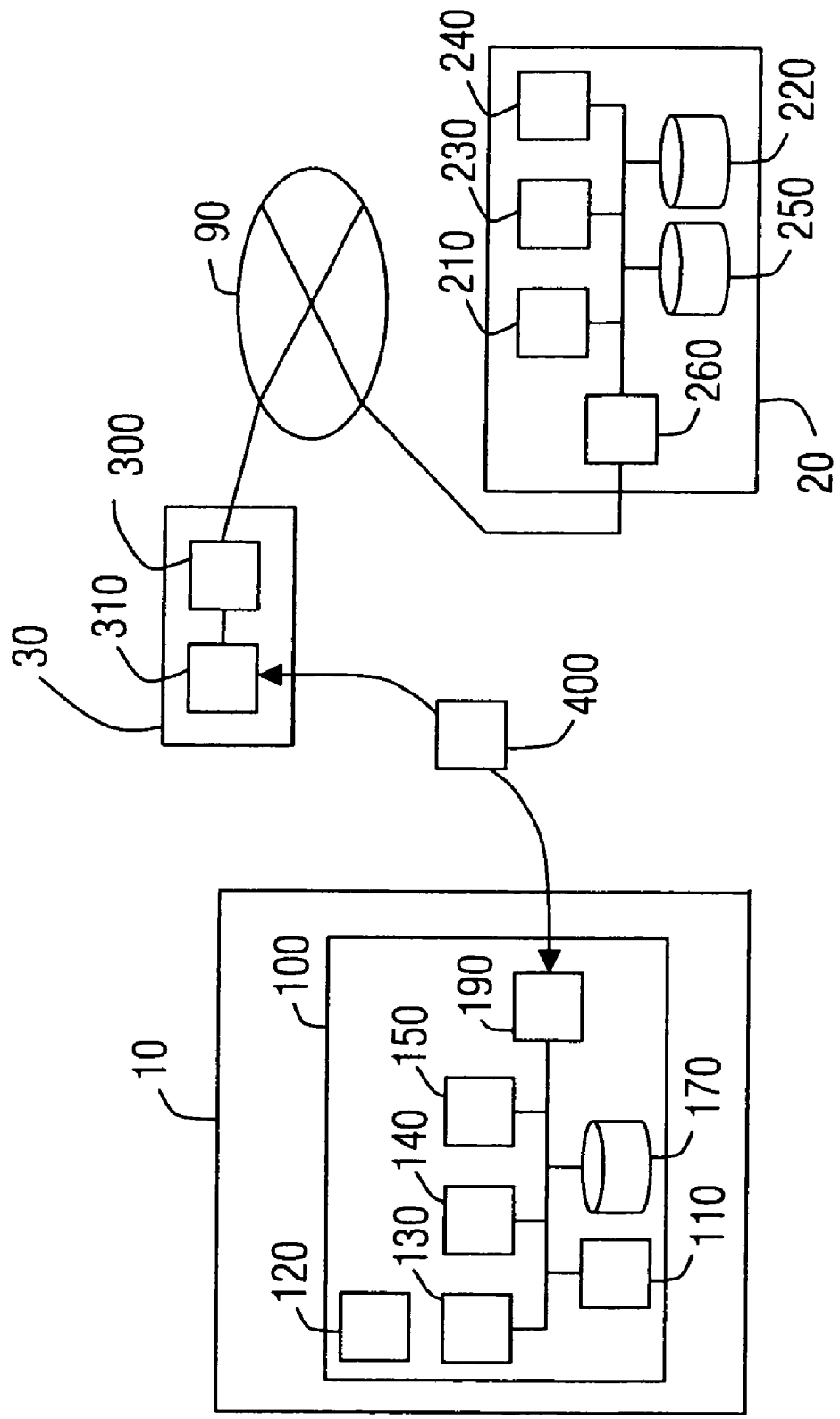
FIG. 14 is a block diagram of a navigation system in accordance with an alternative embodiment of the invention.

For the navigation system with this configuration, the following is a specific explanation with reference to FIG. 14.

In navigation system 1b shown in FIG. 14, with personal computer 300 being connected to network 90 and provided in home 30 or other location remote from the terminal 100, the service of service provider 20 is realized as aforementioned. The result is stored via external memory slot 310 in external memory 400 (Compact Flash (Compact Flash is a registered trademark of Sandisk Corp.) memory stick, SD card, USB memory, or portable HDD, or other portable recording medium), and external memory 400 is connected to external memory slot 190 provided on information terminal 100. As a result, the same processing is performed in information terminal 100 in the same way as in the first and second embodiments.

Also, a scheme can be adopted in which the information stored in external memory 400 is stored in a storage device (not shown in the figure) owned by service provider 20, and the user of vehicle 10 accesses service provider 20 from information terminal 100 via network 90, and the data is downloaded from the storage device owned by service provider 20.

This constitution may also be adopted in the present invention.

Examples of display of navigation system I of the present invention are shown in FIGS. 6, 7, 12 and 13. However, the guiding images that can be displayed on display module 120 of information terminal 100 are not limited to these.

FIG. 15 is a diagram illustrating a specific modified example of the guiding images.

Figure 15A:
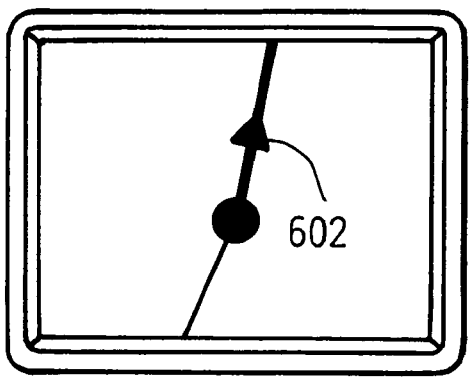
FIGS. 15A through 15D are diagrams of an image displayed in accordance with an alternative embodiment of the invention.

For example, as shown in FIG. 15A, while the route is indicated by a wide line or colored line, arrows 600 indicating the travel direction can also be superimposed. With this display, the user can more easily understand which direction the vehicle should travel, even when using a still image.

Figure 15B:
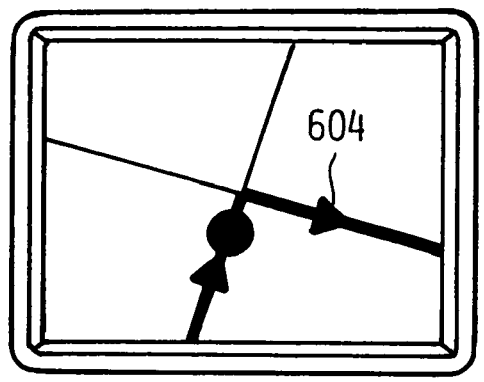
Figure 15C:
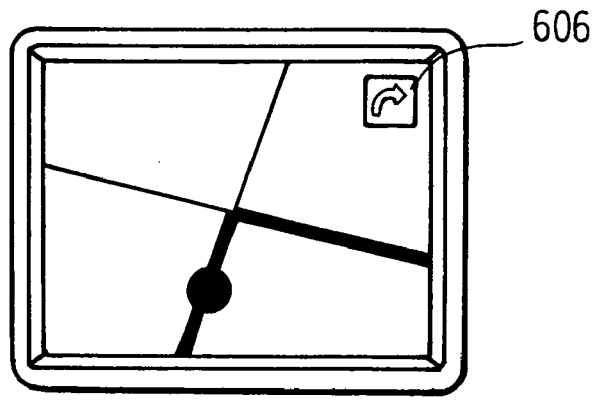

Also, as shown in FIGS. 15B and 15C, while the route is indicated by wide line or colored line, it is also possible to superimpose arrows 604, 606 indicating right/left turns at the guidance points. Such a display enables the user to more easily understand whether the vehicle should turn left or right at the guidance point.

Also, with regard to the display images shown in FIGS. 15A and 15B, when image data generation module 240 prepares the image data corresponding to the various guidance points after computing the route with route computing module 230 of service provider 20, it is preferred that the images be generated superimposed on the map image information at the same time.

Figure 15D:
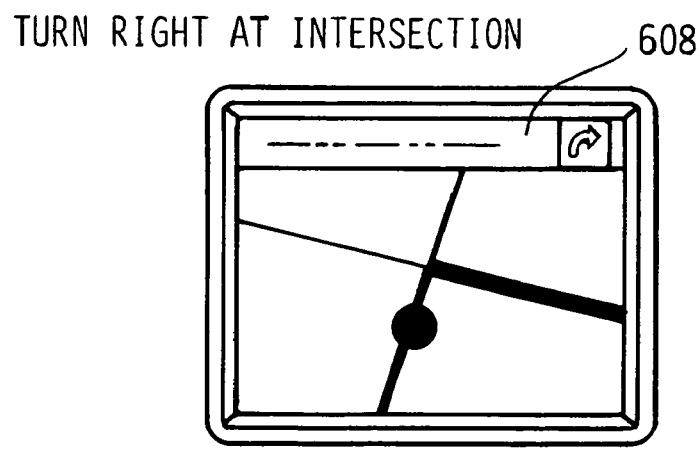

Also, as shown in FIG. 15D, it is also possible to attach text guidance information 608, such as "turn left at  intersection," "turn right onto Interstate ," "turn right at the intersection with a gas station," etc., to the image information, and to superimpose it on the map image information for display on information terminal 100. As a result, the user gains an even more understandable guide service.

Also, the following scheme is preferred for the display image shown in FIG. 15D: after the route is computed by route computing module 230 of service provider 20, the image data corresponding to each guidance point is prepared with image data generation module 240; in this case, the text information of "turn left at intersection " is attached to the image file, and when it is displayed on information terminal 100 by display image generation module 130**, this text guide information is superimposed and displayed on the image.

Also, the guidance of vehicle 10 to the destination by navigation system 1 is not limited to visual means with an image being displayed on display module 120.

For example, the following scheme may be adopted: information terminal 100 has an audio player, and the text guidance information explained with reference to FIG. 15D is output as a voice using the audio player. In this configuration, the driver of vehicle 10 can be guided with an even better understanding of the guidance information.

When audio output is performed by information terminal 100, the following scheme can also be adopted: information terminal 100 has a voice synthesizer, and the text guidance information transferred as information appended to the image file can be read by the voice synthesis means.

Also, the following scheme can be adopted: the route is computed by route computing module 230 of service provider 20 and the image data corresponding to each guidance point is formed by image data generation module 240; in this case, the text guide information of "turn left at  intersection," "turn right onto Interstate ," "turn right at the intersection with a gas station," etc., is voice-synthesized to form an audio file, and the obtained audio file is appended to the image file and transferred to information terminal 100. This audio file is reproduced at information terminal 100 to obtain a voice output.

As another guidance scheme, the following scheme can also be adopted: the distance is computed from the position information and the latitude and longitude information for the guidance point, the distance is displayed, and the distance information is read out as a synthetic voice.

In these embodiments, the information of the position of the central point of the image data latitude and longitude information is appended to the image data in the image file, and, the position of vehicle 10 is determined based on this information and the position of vehicle 10 determined by position information acquisition module 150. However, this position information may be any prescribed point on the image, not just the central point. For example, the latitude and longitude information for the upper-left corner of the image can be used, or the latitude and longitude information of the upper-left corner and lower-right corner can also be used as the appended information.

This application is based on Japanese Patent Application No. 2004-381377, filed Dec. 28, 2004 in the Japanese Patent Office, the entire contents of which are hereby incorporated by reference.

Also, the above-described embodiments have been described in order to allow easy understanding of the present invention, and do not limit the present invention. On the contrary, the invention is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A navigation system for guiding a movable body from a starting point to a destination, comprising:
   (a) a user interface adapted to accept information pertaining to the destination and the starting point;
   (b) a route computing module in communication with the user interface and adapted to generate a route from the starting point to the destination, and to generate guidance information including a prescribed site for at least the destination and each point where route changes occur;
   (c) an image data generation module adapted to generate a map image for each prescribed site of a prescribed range around the prescribed site and an expanded range map image of each intermediate route including consecutive prescribed sites at each end of the intermediate route in a travel direction of the route;
   (d) a position information acquisition module that outputs the position of the movable body;
   (e) a display image generation module responsive to the position information acquisition module to superimpose on the map image an indicia indicating the position of the movable body when the movable body is within the prescribed range of the prescribed site and to superimpose on the expanded range map image an indicia indicating the position of the movable body when the movable body is outside of both prescribed sites included in the expanded range map image; and
   (f) a display adapted to display the guidance information, the map image, the expanded range map image and the superimposed indicia, each image displayed singly and in a sequential order.

2. The navigation system of claim 1, further comprising:
   a server including the route computing module, the image data generation module, and a memory on which is stored the guidance information; and
   a terminal device that moves with the movable body, and that includes the position information acquisition module, the display image generation module and the display;
   wherein the server device determines the route for guiding the movable body and generates the guidance information and the map and expanded range map images pertaining to the route based on the information pertaining to the destination and starting point input via the user interface; and
   the terminal device displays the guidance information, the map and expanded range map images, and the superimposed indicia to indicate the position of the movable body.

3. The navigation system of claim 2, wherein the server and the terminal device are connected to each other via a communication network; the information pertaining to the destination and the starting point of the movable body is input from the terminal device via the communication network to the server; and the guidance information and the map and expanded range map images generated in the server are transmitted via the communication network from the server to the terminal device.

4. The navigation system of claim 2, further comprising:
   a computing device connected to the server via the communication network and including the user interface;
   a receiver adapted to receive via the communications network the guidance information and the map and expanded range map images generated by the server; and
   a recording device adapted to store on a portable recording medium the guidance information and the map and expanded range map images received from the server;
   wherein the terminal device is further adapted to receive guidance information and the map and expanded range map images via the portable recording medium.

5. The navigation system of claim 1, wherein the prescribed site is at a center of each map image.

6. The navigation system of claim 1, wherein the route computing module is further adapted to include map image position information in each map image; and the display image generation module is further adapted to superimpose the indicia in a location in at least one map image based on the position of the movable body and the map image position information contained in that map image.

7. The navigation system of claim 1, wherein the display is adapted to display at least one of the map image and the expanded range map image with the route highlighted.

8. The navigation system of claim 1, wherein the display is adapted to display at least one of the map image and the expanded range map image with at least one symbol superimposed on the route indicating the direction of travel.

9. The navigation system of claim 1, wherein the display is further adapted to display a symbol indicating the prescribed change in direction of travel direction for at least one prescribed site where the course of the movable body on the route should be changed based on the guidance information.

10. The navigation system of claim 1, wherein the guidance information includes text information pertaining to at least one prescribed site where the course of the movable body should be changed based on the route; and the display is further adapted to display the text information for at least one prescribed site.

11. The navigation system of claim 1, wherein the guidance information includes text information pertaining to at least one prescribed site where the course of the movable body should be changed based on the route; and further comprising a voice synthesizer that outputs the text information.

12. The navigation system of claim 1, wherein the guidance information includes voice data pertaining to at least one prescribed site where the course of the movable body should be changed based on the route; and further comprising a player that outputs the voice data.

13. A navigation system for guiding a movable object from a starting point to a destination, comprising:
   (a) input means for inputting information pertaining to the destination and the starting point;
   (b) route determining means for determining a route from the starting point to the destination;
   (c) guidance information generating means for generating guidance information for guidance along the determined route, the guidance information including one or more prescribed sites on the route in addition to the prescribed site defined by the destination, map image information for prescribed ranges around each prescribed site on the route, and expanded range map image information for intermediate routes, each intermediate route including consecutive prescribed sites at each end of the intermediate route;
   (d) movable body position determining means for determining the position of the movable body;
   (e) movable body position superimposing means for superimposing on the map image information an indicia indicating the position of the movable body when the movable body is within the prescribed range of the map image information and for superimposing on the expanded range map image information an indicia indicating the position of the movable body when the movable body is outside of the prescribed ranges for those of the prescribed sites included in the expanded range map image information; and (f) display means for sequentially displaying the map image information and the expanded range map image information, each with the superimposed indicia to indicate the position of the movable body.

14. A method for navigating a movable object from a starting point to a destination, comprising:
    (a) inputting the information pertaining to the destination and starting point;
    (b) using a database of map information, computing a route for the moving body from the starting point to the destination point;
    (c) determining at least one prescribed site, other than a prescribed site defined by the destination point, that is along the route and occurs where the course of the moving body will change;
    (d) generating for each prescribed site a map image for an area within a prescribed range of the prescribed site;
    (e) generating for each intermediate route between consecutive prescribed sites an expanded range map image including an intermediate route and the consecutive prescribed sites at each end of the intermediate route;
    (f) determining the location of the movable body; and
    (g) if the movable body is within the prescribed range of the prescribed site, displaying the map image with an indicia superimposed on the map image to indicate the location of the movable body; and
    (h) if the movable body is outside of the prescribed range of the prescribed site, displaying the expanded range map image containing the prescribed site and the next sequential prescribed site with an indicia superimposed on the expanded range map image to indicate the location of the movable body.

15. The method of claim 14, wherein a server remote from the moving body computes the route, determines the prescribed site and generates the map and expanded range map images; and
    a terminal device that is borne by the movable body inputs the information pertaining to the destination and starting point, determines the location of the movable body and displays the map and expanded range map images.

16. The method of claim 15, further comprising:
    transmitting the information pertaining to the destination and the starting point from the terminal device to the server via a communications network; and
    transmitting the map and expanded range map images from the server to the terminal device via the communications network.

17. The method of claim 15, further comprising:
    storing on portable recording media the prescribed sites, map image and expanded range map image generated by the server; and
    inputting the prescribed sites, map image and expanded range map information to the moving body device from the portable recording media.

18. A server for generating information for navigating a movable body from a starting point to a destination, comprising:
    (a) an input to receive the starting point and destination;
    (b) memory on which is stored map image information and route information;
    (c) a route computing module in communication with the input and the memory, and adapted to generate a route from the starting point to the destination; and to generate guidance information for guidance along the route, the guidance information including at least one prescribed site on the route other than a prescribed site defined by the destination; and
    (d) an image data generation module adapted to generate a map image for each prescribed site of a prescribed range around the prescribed site and to generate an expanded range map image for each intermediate route, each intermediate route including one of the prescribed sites at a first end thereof and a second one of the prescribed sites at a second end thereof, the second one of the prescribed sites subsequent to the one of the prescribed sites along a travel direction of the route.

19. A movable body terminal device for use in a navigation system that guides a movable body along a route from a starting point to a destination, comprising:
    (a) a receiver adapted to receive guidance information for the route, including at least one prescribed site other than a prescribed site defined by the destination, map image information for an area within a prescribed range around the prescribed site and expanded range map image information of each intermediate route including consecutive prescribed sites at each end of the intermediate route;
    (b) a position information acquisition module that outputs the position of the movable body;
    (c) a display image generation module responsive to the position information acquisition module to superimpose on the map image information an indicia indicating the position of the movable body when the movable body is within the prescribed range of the prescribed site and to superimpose on the expanded range map image information the indicia when the movable body is outside of the prescribed ranges of both the prescribed sites at each end of the intermediate route; and
    (d) a display adapted to sequentially display the map image information and the expanded range map image information, each with the superimposed indicia to indicate the position of the movable body along the route.

20. A computer program product comprising computer-readable medium having a control logic stored therein for causing a computer to accept as input a starting point and a destination; to determine a route from the starting point to the destination using map data, which route includes a prescribed site for each route change opportunity; and to generate guidance information including map image information for each prescribed site of an area within a prescribed range of the prescribed site and including expanded range map image information of each intermediate route including consecutive prescribed sites at each end of the intermediate route.

21. The computer program product of claim 20, wherein the route change opportunity is centered within the prescribed range of the map image.

22. A computer program product implemented in a terminal device for use in a navigation system that guides a movable body along a route from a starting point to a destination, comprising a computer-readable medium having a control logic stored therein for causing a computer to:
    accept as input guidance information for the route from the destination to the starting point, map image information for at least one area within a prescribed range around at least one prescribed site on the route and for an area within a prescribed range around a prescribed site defined by the destination, and expanded range map image information of each intermediate route including consecutive prescribed sites at each end of the intermediate route;

accept as input the position of the movable body;

superimpose on the map image information an indicia indicating the position of the movable body when the movable body is within the prescribed range of the prescribed site and on the expanded range map image information when the movable body is outside of the prescribed range of the prescribed site and has not yet reached the prescribed range of the next prescribed site; and display the map image information and the indicia and the expanded range map image information and the indicia in sequence based on a travel direction of the route.

23. The computer program product of claim 22, wherein the control logic causes the computer to determine the position in the map image information on which the indicia is superimposed based on the position of the movable body and additional information indicating the position of the map image that is appended to the map image information.

24. The computer program product of claim 22 wherein the control logic causes the computer to display the map image information with the route highlighted.

25. The computer program product of claim 22 wherein the control logic causes the computer to display one or both of the map image information and the expanded map image information with symbols superimposed on the route indicating the moving body's direction of movement.

26. The computer program product of claim 22 wherein the control logic causes the computer to display a symbol for indicating the change in direction of travel along the route.

27. The computer program product of claim 22 wherein the control logic causes the computer to display text information pertaining to the route for at least one prescribed site on the route where the course of the movable body on the route should be changed based on the route.

28. The computer program product of claim 22 wherein the guidance information includes text information pertaining to at least one prescribed site that is a turning point, wherein the control logic causes the computer to generate a signal adapted to instruct a voice synthesizer to output the text information.

29. The computer program product of claim 22 wherein the guidance information includes voice data pertaining to at least one prescribed site that is a turning point, wherein the control logic causes the computer to generate a signal adapted to instruct a player to output the voice data.

* * * * *